(12) United States Patent
Calzada et al.

(10) Patent No.: US 7,913,615 B2
(45) Date of Patent: Mar. 29, 2011

(54) AUTOMATED DUAL COOKING SURFACE GRILL AND METHOD

(75) Inventors: Manuel Calzada, Rolling Meadows, IL (US); Ron Dorsten, Glenview, IL (US); Mike Zagorski, Arlington Heights, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 1257 days.

(21) Appl. No.: 11/413,642

(22) Filed: Apr. 28, 2006

(65) Prior Publication Data
US 2007/0254078 A1 Nov. 1, 2007

(51) Int. Cl.
*A47J 43/28* (2006.01)
*A23C 3/00* (2006.01)

(52) U.S. Cl. ............... 99/342; 99/349; 99/350; 99/367; 99/372; 99/374; 99/379; 99/385; 99/389; 99/422; 426/523

(58) Field of Classification Search ............ 99/349, 99/350, 367, 372, 374, 379, 385, 389, 422; 426/523; *A23C 3/00*
See application file for complete search history.

(56) References Cited

U.S. PATENT DOCUMENTS

| | | | |
|---|---|---|---|
| 4,483,239 A | 11/1984 | Mueller et al. | |
| 4,627,335 A | 12/1986 | Sherman et al. | |
| 4,763,571 A | 8/1988 | Bergling et al. | |
| 5,247,874 A | 9/1993 | George, II et al. | |
| 5,341,727 A * | 8/1994 | Dickson | 99/335 |
| 5,473,976 A | 12/1995 | Hermansson | |
| 5,486,685 A * | 1/1996 | Dodds | 219/720 |
| 5,558,797 A * | 9/1996 | Takagi | 219/705 |
| 5,590,588 A * | 1/1997 | Tomimatsu | 99/423 |
| 5,611,327 A * | 3/1997 | Teixeira Filho et al. | 126/39 R |
| 5,640,895 A | 6/1997 | Anetsberger | |
| 5,713,264 A | 2/1998 | Pomara, Jr. | |
| 5,755,150 A | 5/1998 | Matsumoto et al. | |
| 5,791,234 A | 8/1998 | Newton et al. | |
| 5,847,365 A * | 12/1998 | Harter et al. | 219/492 |
| 5,910,207 A | 6/1999 | Newton et al. | |
| 5,934,182 A | 8/1999 | Harter et al. | |
| 6,016,743 A * | 1/2000 | Glavan | 99/349 |
| 6,079,321 A * | 6/2000 | Harter et al. | 99/349 |
| 6,253,761 B1 * | 7/2001 | Shuler et al. | 126/42 |
| 6,439,108 B1 | 8/2002 | Wu | |
| 6,614,007 B1 | 9/2003 | Reay | |
| 7,082,941 B2 * | 8/2006 | Jones et al. | 126/39 H |
| 7,375,294 B2 * | 5/2008 | Kraft | 177/25.15 |
| 2005/0000957 A1 | 1/2005 | Jones et al. | |
| 2005/0193897 A1 * | 9/2005 | Nevarez et al. | 99/349 |
| 2005/0279222 A1 | 12/2005 | Nevarez et al. | |
| 2007/0254080 A1 * | 11/2007 | Schackmuth et al. | 426/523 |

FOREIGN PATENT DOCUMENTS
EP 0974299 A2 1/2000
* cited by examiner

*Primary Examiner* — Shawntina Fuqua
(74) *Attorney, Agent, or Firm* — Ryndak & Suri LLP

(57) ABSTRACT

A dual-sided cooking device is provided that determines whether the upper and lower cooking platens are substantially parallel to each other when in a cooking position. In addition, the method and device in accordance with the invention are capable of identifying a type of food item placed on a lower cooking platen of a two-sided cooking grill.

30 Claims, 5 Drawing Sheets

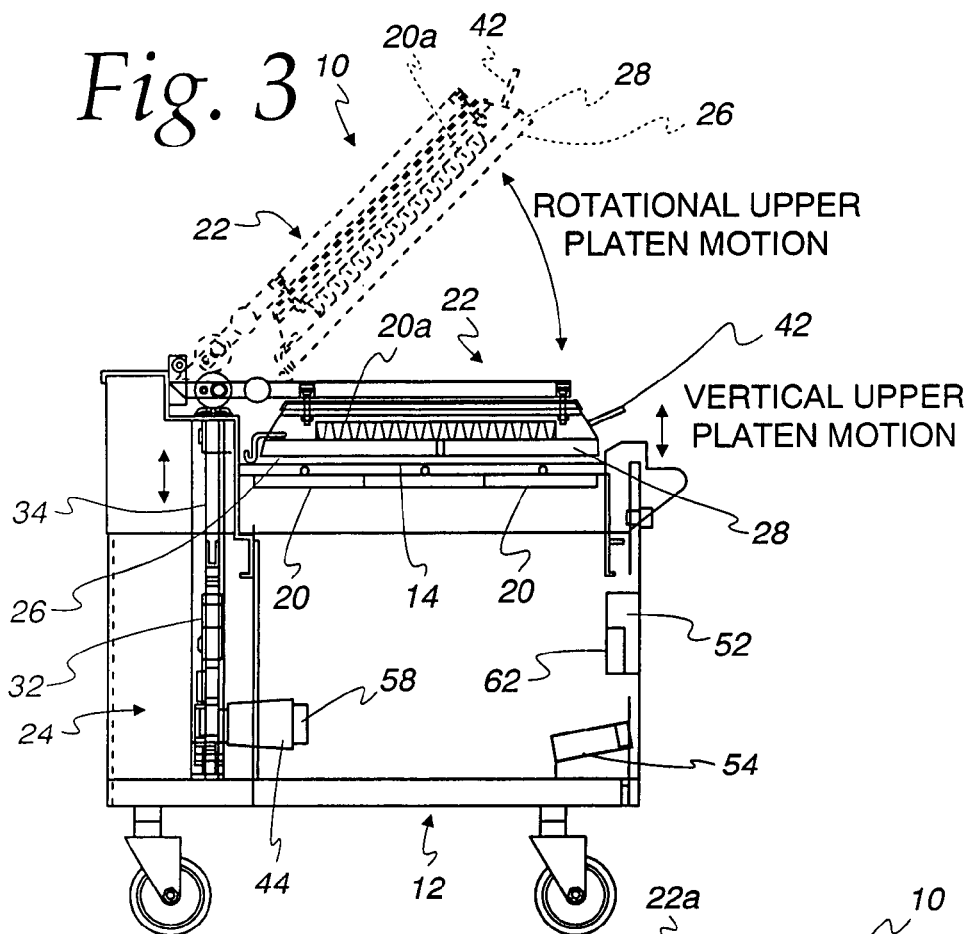
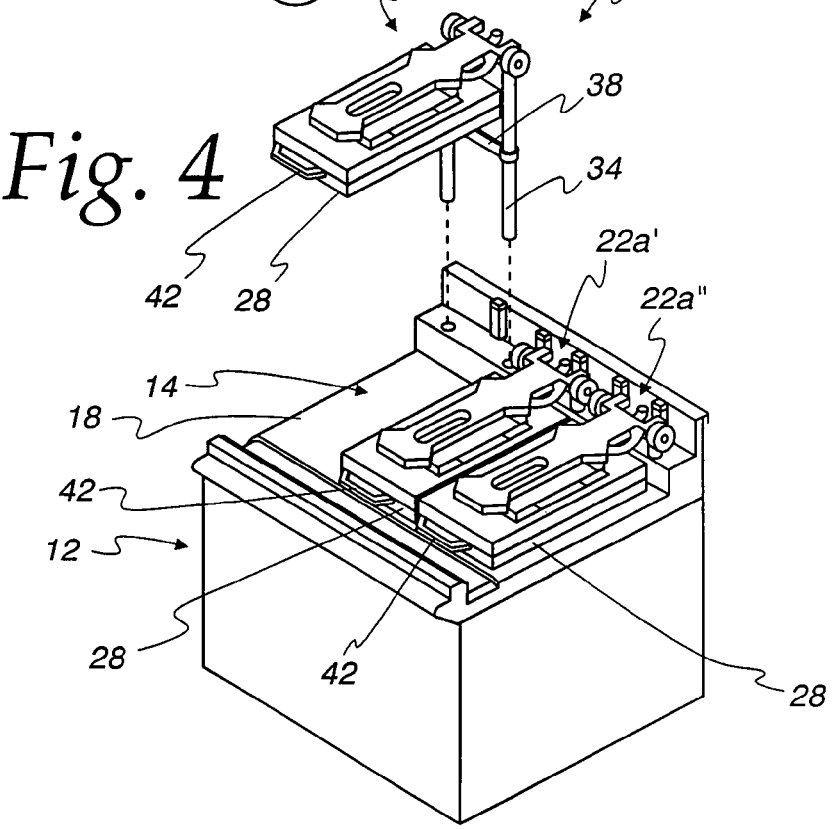

AUTOMATED DUAL COOKING SURFACE GRILL AND METHOD

FIELD OF THE INVENTION

The present invention relates to a device for cooking food. More particularly, the present invention relates to a dual cooking surface or clamshell grill device suitable for the two-sided cooking of food.

BACKGROUND OF THE INVENTION

Various types of cooking devices are known in the art. Specifically, various types of grills are known. In one type of grill, the food is placed on a grilling surface, grilling the side of the food that contacts the grilling surface. After that side of the food is cooked, the food is manually turned or flipped to cook the opposite side. After the second side of the food is cooked, the food is removed from the grill for further preparation and/or serving.

In another type of grill, two-sided cooking is accomplished simultaneously. Such grills are commonly known as clamshell grills and have upper and lower cooking platens that are horizontally opposed for contacting the two sides of a food item simultaneously to thereby cook both sides simultaneously.

For proper performance, the two grilling surfaces should be parallel to each other so that each surface uniformly contacts and cooks the associated side of the food item that contacts a respective platen cooking surface.

A need exists for a device and method for determining whether the platens are in a parallel or substantially parallel orientation when in the cooking position. In addition, a need exists for an automated clamshell-type grill that is capable of identifying food product types.

SUMMARY OF THE INVENTION

In accordance with the present invention, a method of cooking food with a dual-surface grill is provided. The grill typically is of the type that has upper and lower cooking platens. The method includes automatically determining prior to the start of a cooking cycle whether an upper cooking platen and a lower cooking platen are substantially parallel to each other when in a cooking position. If the upper platen and the lower platen are substantially parallel to each other, the food is contacted with the upper and lower platens to cook the food. If the upper and lower platens are not substantially parallel to each other, at least one of the upper and lower platens is adjusted so that the upper and lower platens are at least substantially parallel to each other when in a cooking position. After the adjustment, if necessary, the food is contacted with the upper and lower platens to thereby cook the food.

In accordance with another aspect of the method, the step of automatically determining whether the platens are substantially parallel to each other includes advancing the platens towards each other to a predetermined distance between the platens, which may be zero or contact between the platens, is reached and the distance between the platens is determined at a plurality of locations. This can be done by using a suitable sensor. Typically, the distance between the platens is determined at least two different locations and may be determined at, for example, at least three different locations, or four or more different locations. A sensor may be provided at each location for this purpose. A contact, pressure, optical or other type of sensor can be used for this purpose.

The adjustment of the platens when they are not parallel or sufficiently parallel may be accomplished in any suitable manner. The adjustment may be done manually or automatically, for example. Typically, the adjusting will include adjusting the platen so that at each location where the distance is sensed, the distance between the platens is substantially identical resulting in platens that are at least substantially parallel to each other. The adjusting may include adjusting the platens at each location so that the distance between the platens at each location is substantially identical. The platens may be automatically adjusted to be at least substantially parallel if, for example, prior to the start of a cooking cycle, the procedure of automatically determining whether the upper and lower cooking platens are substantially parallel to each other when in a cooking position finds that the platens are not substantially parallel to each other.

In accordance with another aspect of the invention, a method of identifying a type of food item is provided. The method includes using a two-sided grill having upper and lower cooking platens. The method includes placing at least one food item having a characteristic height on a lower platen of an upper and lower platen grill, moving the upper platen toward the lower platen, sensing when the upper platen contacts the food item and determining the distance between the platens when the upper platen contacts the food item. The distance is a measure of the characteristic height of that type of food item and the food item can be identified based on the distance compared to the characteristic height of at least one food item which may be the same food item or a different food item from that located on the lower platen.

In accordance with another aspect of the method, a plurality of characteristic heights of food items, each height corresponding to a different food item, is stored in a computer accessible memory associated with the dual-sided cooking device.

In accordance with another aspect of the invention, the method may further include comparing a determined distance to the plurality of stored characteristic heights to identify the food item.

In accordance with another aspect of the present invention, a method is provided for determining the number of food items of the identified type that are located on the lower cooking platen. The method for determining the number of food items on the lower platen may include weighing the food items while located on the lower platen. Any suitable type of weighing device can be utilized in accordance with the invention, including, for example, a scale, a load cell, or other weighing device as desired.

The method of determining the number of food items located on the lower platen may further include comparing the weight of the food items on the lower platen to an integer multiple of a plurality of characteristic food item weights to thereby determine the integer number which equals the number of food items located on the cooking platen.

In accordance with another aspect of the invention, the method of determining the number of food items located on the lower platen includes identifying the number of food items with a machine vision device, which may include a camera.

In accordance with another aspect of the invention, a dual-surface grill is provided. The grill includes a support structure with a lower cooking platen and an upper cooking platen mounted to the support structure. The upper platen is mounted for movement between a cooking orientation and a non-cooking position, the platens being at least substantially parallel to each other when in the cooking position when properly adjusted.

Structure is provided for sensing distance between the platens when they are located in the cooking orientation and structure is provided for determining when the upper platen contacts a food item placed on the lower platen. In addition, structure is provided for automatically determining the distance between the upper and lower platens when the upper platen contacts the food item on the lower platen. A suitable sensor or sensors, providing input to a microprocessor or a microcontroller, can be employed for this purpose.

In accordance with another aspect of the invention, the grill further includes a computer accessible memory that stores a plurality of characteristic food heights, each height corresponding to a different food item, such as a 1/10 lb. (10:1 patty) hamburger and a 1/4 lb. hamburger (4:1 patty).

In accordance with another aspect of the invention, a computer processor is part of the grill for comparing the determined height to the plurality of characteristic heights to determine the product type contained on the lower platen. Such a grill may also include structure for determining the number of food items present on the lower platen. The structure for determining the number of food items may include a weighing device associated with the lower platen. Any suitable type of weighing device can be utilized including a load cell or any other type of scale or weighing device.

In addition, the structure for determining the number of food items placed on the lower platen may include a machine vision device.

The grill may also include computer accessible memory containing cooking data corresponding to cooking data for different food items. The grill may further include a microprocessor controller for operating the grill in accordance with the cooking data for the type of food item determined to be located on the lower platen.

In accordance with another aspect of the invention, the grill may include structure for determining when the upper platen contacts a food item on the lower platen. Any suitable device may be utilized for this task, including a pressure sensing device.

In accordance with another aspect of the invention, a dual-sided grill for cooking food is provided. The grill includes structure for automatically determining whether the upper and lower cooking platens are relatively parallel to each other when the platens are in a cooking orientation or position. The grill includes support structure with upper and lower cooking platens mounted to the support structure with the upper cooking platen mounted for movement between a cooking orientation or position and a non-cooking orientation or position. The platens are intended to be at least substantially parallel to each other when in the proper cooking orientation. Structure is provided for sensing the distance between the platens when in the cooking orientation and structure is provided for automatically determining whether the upper and lower platens are relatively substantially parallel to each other when the platens are in the cooking orientation. Such structure may comprise a suitable sensor that provides input to a microprocessor or a microcontroller.

The device in accordance with this aspect of the invention may further include structure for adjusting at least one of the platens with respect to the other platen so that the platens can be placed in a relatively parallel relationship when in the cooking orientation. The structure for adjusting the relative orientation of the platens may comprise a plurality of manually adjustable devices for changing the relative orientation of portions of the platens with respect to each other.

In accordance with another aspect of this embodiment of the grill device, structure is provided for determining when the upper platen contacts a food item placed on the lower platen and structure is provided for determining the distance between the upper platen and the lower platen when the upper platen contacts the food item on the lower platen. In addition, the grill may further include computer accessible memory storing a plurality of characteristic heights, each height corresponding to a different food item. A computer processor may also be included to compare the different height to the plurality of characteristic heights to determine the product type contained on the lower cooking platen.

In accordance with another aspect of this grill embodiment of the present invention, structure may be provided for determining the number of food items that are present on the lower platen. The structure for determining the number of food items on the lower platen can be as previously described and may be a weighing device associated with the lower platen, a machine vision device or other suitable device.

In accordance with another aspect of this embodiment of the invention, the grill device further includes cooking data corresponding to the different food items and a microprocessor controller for operating the grill in accordance with the cooking data for the type of food item determined to be located on the lower platen.

In accordance with another aspect of the invention, the structure for determining when the upper platen contacts a food item located on the lower platen includes a pressure sensing device or a plurality of such devices.

BRIEF DESCRIPTION OF THE DRAWINGS

FIG. 3 is a side elevation view of the grill of FIG. 1 illustrating movement of the upper platen between a fully open position and the cooking orientation;

FIG. 4 is a perspective view of a portion of the grill of FIG. 1;

DETAILED DESCRIPTION OF THE INVENTION

Figure 1:
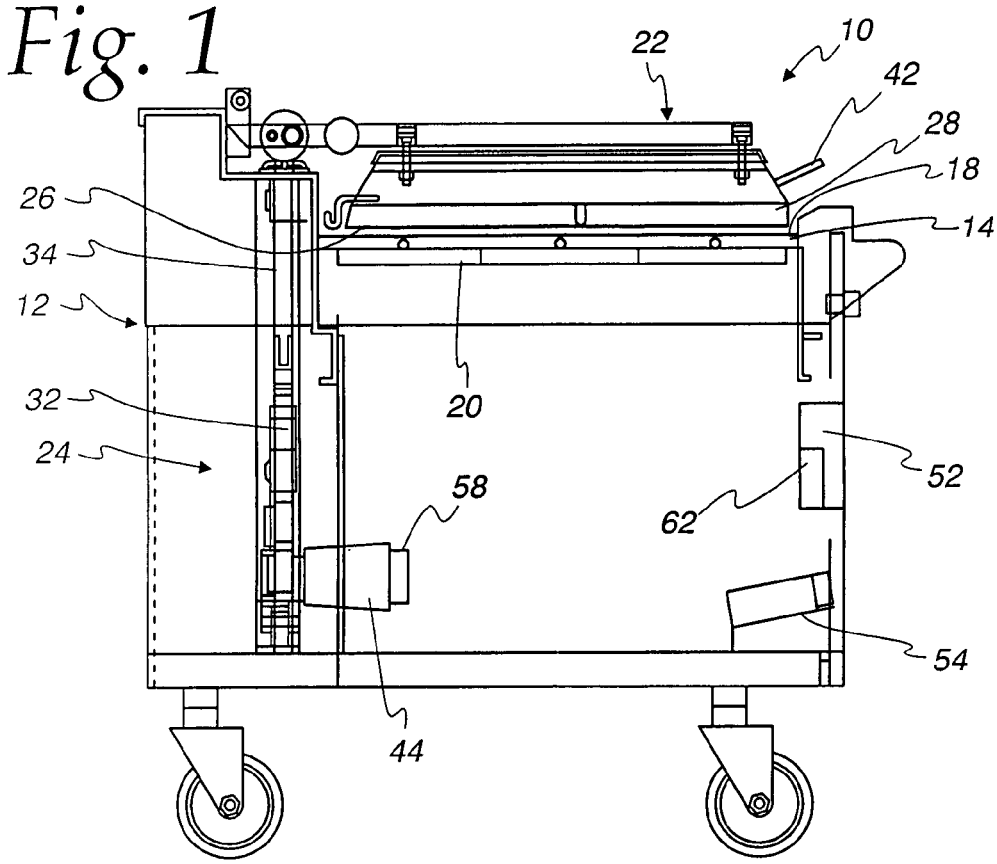
FIG. 1 is a side elevation view of a clamshell grill in accordance with the invention.
Figure 2:
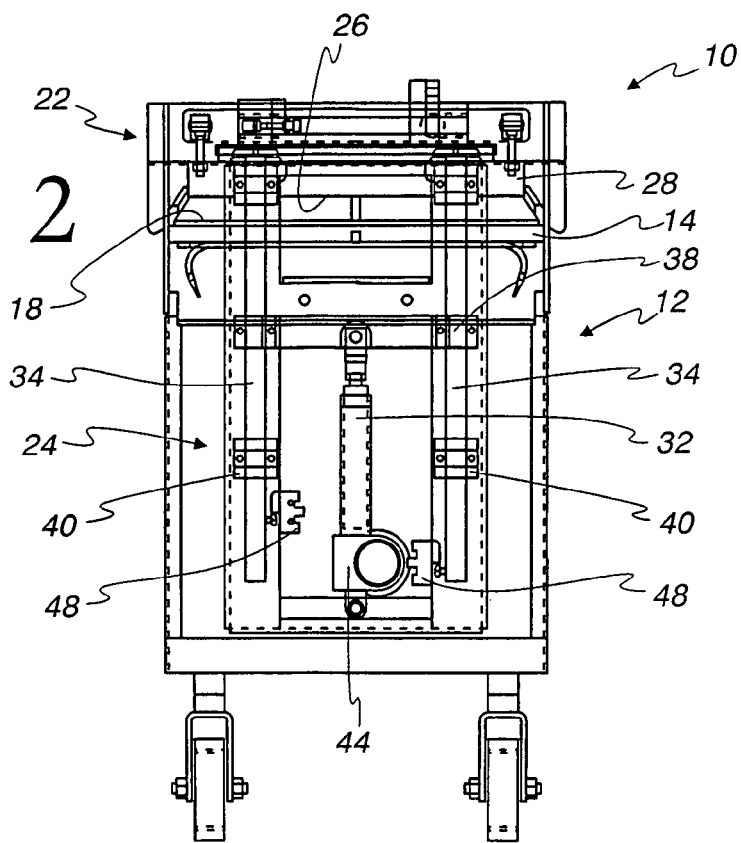
FIG. 2 is a rear elevation view of the grill of FIG. 1.

Referring to the Figures generally, and in particular to FIG. 1, there is illustrated a clamshell grill 10 in accordance with the invention. Generally, basic clamshell grills are well known in the art and hence a specific explanation of each component is not provided herein. For example, clamshell grills are disclosed in U.S. Patent Application Publication Number 2005/0000957 to Jones et al., U.S. Pat. No. 6,079,321 to Harter et al. and U.S. Pat. No. 6,614,007 to Reay, for example, the entire disclosures of which are hereby expressly incorporated by reference.

Referring to FIGS. 1-4, there is illustrated an exemplary configuration of clamshell grill 10 with which the present invention may be utilized. Clamshell grill 10 includes a support structure 12 to which a lower cooking platen 14 is horizontally mounted. Lower platen 14 has a generally smooth, flat cooking surface 18 on its upper side. Lower platen 14 is heated to cooking temperature by one or more heating units 20, which may be gas or electric. By way of example, three heating units 20 are shown. In this embodiment, lower platen 14 is of substantial dimension, for example, two feet by three feet or as desired, to accommodate large numbers of food items at once.

An upper platen assembly 22 is movably mounted to the rear of support structure 12 by means of an upper platen positioning mechanism 24. Upper platen assembly 22 comprises an upper cooking platen 28 heated to cooking temperature by heating elements 20a mounted within a casing. Upper cooking platen 28 may be of an equivalent size to lower cooking platen 14. In the illustrated embodiment, three upper cooking platens 22a, 22a', 22a" are provided that together approximate the size of lower cooking platen 14. Each upper platen 28 has a flat cooking surface 26 and may be independently heated. By mounting three upper platen assemblies 22 over a single lower platen 14, three independent cooking zones between upper platen cooking surfaces 26 and lower platen cooking surface 18 may be created to allow greater flexibility for the cook/operator. For example, upper platen assembly 22a may be used to cook one food product, while other food products can be simultaneously cooked adjacent upper platen assemblies 22a' and 22a". In other instances, one batch of food product, for example hamburger patties may be in the middle of a cooking cycle adjacent upper platen assembly 22a. If additional customer orders are received, the cooking of additional patties may be initiated at upper platen assembly 22a' or 22a", while patties continue to cook at upper platen assembly 22a.

As known in the art, positioning mechanism 24 may be used to facilitate two distinct motions by upper platen assembly 22 from its uppermost position to a cooking position. One motion is a rotational motion to rotate upper platen assembly 22 from an upward open position, for example at an angle of 54 degrees to the horizontal, to a downward horizontal cooking position parallel to lower platen 14. The other motion is a linear vertical motion to space a horizontally oriented upper platen assembly 22 relative to the lower platen 14. To provide the vertical movement to change the height of upper platen assembly 22 relative to cooking surface 18, a linear actuator 32 is linked to two vertical reciprocating shafts 34 by an actuator cross bar linkage 38. Actuator cross bar linkage 38 is clamped to vertical reciprocating shafts 34, which run through linear motion bearings 40. The rotational movement of upper platen assembly 22 may be manually accomplished by means of a handle 42. Alternatively, grill 10 may include means known in the art to automatically rotate upper platen assembly 22 between the open upward position and horizontal orientation.

The linear actuator assembly comprises a drive motor 44, linear actuator 32, two substantially vertical reciprocating shafts 34 and position sensor switches 48. Linear actuator 32, when activated, moves upper platen assembly 22 and upper platen 28 vertically. As is known in the art, grill 10 may also include a rotation providing mechanism to translate vertical movement of linear actuator 32 into rotational movement of upper platen assembly 22. The rotation providing mechanism rotates upper platen assembly 22 upwards from a horizontal orientation to an open position shown in FIG. 3 as linear actuator 32 completes its upward stroke. Likewise, as linear actuator 32 begins its downward stoke, the rotation providing mechanism rotates the upper platen assembly 22 back to a horizontal, or closed, orientation.

Figure 8:
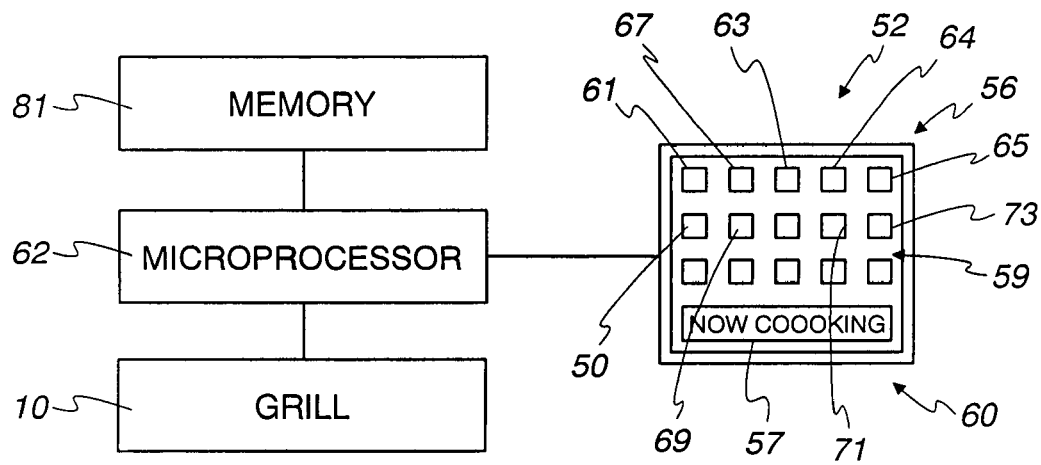
FIG. 8 is a schematic block diagram of a clamshell grill in accordance with the invention.

Grill 10 includes a user interface 52, best seen in FIG. 8. Interface 52 includes an activation or begin cooking cycle button 50 that is depressed to start a cooking cycle. At that time user interface 52 sends information to a microprocessor 62 that is in data communication with a motor position controller 54. This information is used by motor position controller 54 to activate linear drive motor 44. In one embodiment, the action of the rotational motion of linear drive motor 44 causes electrical pulses to be generated by a positioning pulse encoder 58. The pulses generated by positioning pulse encoder 58 are received by motor position controller 54. This information and the activation of lower position sensor switch 48 allows motor controller 54 to accurately position the entire drive system to a predetermined upper platen assembly 22 position for cooking.

In this embodiment, a computer control, such as microprocessor 62, is mounted behind an access plate contained in a simple user-friendly interface 52 located on the front display 60 of the grill 10. Interface 52 comprises a control panel 56 including an alpha-numeric digital display panel 57, operating switches and buttons 59, and LED indicator lights (not shown). As seen in FIG. 8, microprocessor 62 is connected to user interface 52, a computer memory 81 and grill 10, including its operation devices.

An activation button 61 is pressed by the operator to start the movement of upper platen assembly 22 into the cooking position. Typically, a second activation button (not shown) is spaced from activation button 61, and must be pressed simultaneously with activation button 61 to start movement of upper platen assembly 22. Thus, both hands of the operator are in a safe location when grill 10 is activated. Other buttons typically include a "raise platen" button 63, a "cancel" button 65, a "calibrate now" button 67, a "lower platen" button 69, a "close cover" button 71, various food product cooking cycle selections, and the like. The control panel 56 is sealed behind a polyester cover for protection. Data is accepted by the computing device, typically microprocessor 62 and additionally includes, in this embodiment, a suitable computer memory device 81, which may be an EPROM (not shown) pre-programmed with relevant operating or cooking parameters, from control panel 56, temperature sensors, position sensor switches 48, and timer circuitry (not shown). The EPROM is capable of storing a variety of programs, including: menu items, whether individual foods are active or inactive menu items, cooking functions, temperature settings, gap settings, cooking times, and end of cook cycle protocols. The EPROM is easily accessible behind its panel on the control board. This allows for easy substitution in the case of a defect or a change in desired programming.

To illustrate, a typical cooking cycle will be outlined. The grill apparatus begins in an inactive state, with its upper platen assembly 22 in its fully opened and raised position. The upper platen assembly 22 is at an angle from horizontal, for example 54 degrees. The operator will select the relevant product setting, e.g., quarter-pound hamburgers, from the menu on control panel 56, then will load the frozen hamburger patties a single layer thick across the surface area of lower platen 14 which will be covered by one or more of upper platens 22a, 22a' or 22a" when they are lowered. This area may be marked on lower platen 14 for easy reference. When loading is complete, the operator will simultaneously depress the "activation" button 61 and "standby" button (not shown), which are physically offset from one another, to initiate the cook cycle.

At this point several things occur. The temperature sensing thermocouple probes (not shown) located in the lower and upper platens (14, 28) will be sending data to microprocessor 62 and sensing the temperature of the platens. Microprocessor 62 will activate heating elements 20 in lower platen 14 and similar heating elements 20a in upper platen 22 when appropriate. At the same time, upper platen assembly 22 will begin its two-phase descent into cooking position, i.e., rotational, then linear movement. Of course as noted previously, rotational movement may alternatively be provided by manual means. Microprocessor 62 will receive data from positioning pulse encoder 58 and lower sensor switch 48 indicating the relative height of vertical reciprocating shafts 34. The positioning pulse encoder 58 will also provide continuous data on the offset distance between the two positioning switch 48 sites. The pulses received by positioning pulse encoder 58 are monitored and must remain constant for upper platen assembly 22 to remain in proper horizontal level. Microprocessor 62 will activate actuator drive motor 44 which drives linear actuator 32 to begin to lower platen assembly 22.

With the upper platen assembly 22 rotated to the parallel position and suspended above lower platen 14 and hamburger patties, the upper platen assembly 22 can descend downwardly towards the lower platen 14 by linear actuator 32. Linear actuator 32, driven by linear drive motor 44, and controlled by motor position controller 54, continues to lower upper platen assembly 22 to a predetermined position above lower platen 14. This position was programmed into user interface 52 and microprocessor 62 for the specific product to be cooked. The positioning pulse encoder 58 will be sending calibrated height data to microprocessor 62. Any inconsistent data will trigger an error or servicing message on interface 52, and an audible alarm. The height data will pinpoint the height of upper platen assembly 22 above lower platen 14, and above the particular food item to be cooked. The product identification or recognition feature can be used to automatically identify the product on the grill and automatically operate to cook the food thereon according to a preprogrammed set of cooking parameters for that type of food, for example.

Microprocessor 62 will stop linear drive motor 44 at the exact point set forth in its programming for the beginning of the cook cycle. This height measurement is derived from prior testing data on standardized menu items to provide optimal cooking contact and pressure. Microprocessor 62 is capable of controlling the gap setting to a very precise degree, such as down to (+/−) 0.0015 inch gradations. The cooking cycle can be canceled by cancel button 65. This allows the operator to change menu selections or other operating parameters.

Microprocessor 62 will sound an audible signal five seconds prior to the conclusion of the cooking timing sequence to alert the operator that the cooking process has been completed and is ready to begin the process of removing the finished food product. When microprocessor 62 determines that the preset cooking cycle is complete, it automatically restarts the drive motor 44 in the opposite direction causing linear actuator 32 to exert upward force on upper platen assembly 22. Once upper platen assembly 22 is raised a sufficient distance above lower platen 14, upper platen assembly 22 can be manually or automatically rotated to the open position. With open access to lower cooking platen 14, the cooked food product can be removed.

For optimal cooking results, microprocessor 62 can be programmed to follow the following steps: precisely apply pressure to the food item to sear the underside of the food; raise the upper platen 28 to release any trapped steam from the food; and precisely lower upper platen 28 again to apply pressure to the food and sear the upper surface of the food. This pressure is then precisely controlled through the remainder of the cooking process. This process can create a finished food product having excellent appearance and taste.

From the foregoing it can be appreciated that after repeated opening and closing of the upper platen assembly 22, the upper platen assembly 22 may become misaligned and hence no longer be parallel to lower platen cooking surface 18 during the cooking cycle. Over time, upper platen 28 may also become misaligned within upper platen assembly 22, also resulting in a non-parallel orientation of upper platen 28 relative to lower platen 14. Another cause of a non-parallel condition arises when one of the platens 14, 28 becomes warped after repeated cycling thru cooking cycles during which platens 14, 28 are expanded during heating, and contracted during cooling. In addition, misalignment may result from physical trauma to the apparatus, such as might occur by closing the upper platen assembly 22 when a solid article, such as a spatula, has been inadvertently left on lower platen 14.

It is further appreciated that even small misalignments in the parallel relationship between upper platen 28 and lower platen 14, can cause deleterious results in the quality of food product cooked by grill 10. For example, a hamburger patty on one side of a tilted upper platen may be spaced from upper platen 28 and have an insulating air gap therebetween. A patty on the other side of tilted upper platen 28 will have no such air gap and hence cook more quickly. Moreover, the carefully devised cooking cycle of applying pressure to the patty for searing the patty will also be disrupted by a non-parallel alignment. This can result in unacceptable or undesirable variances in the quality of the cooked food product.

Figure 5:
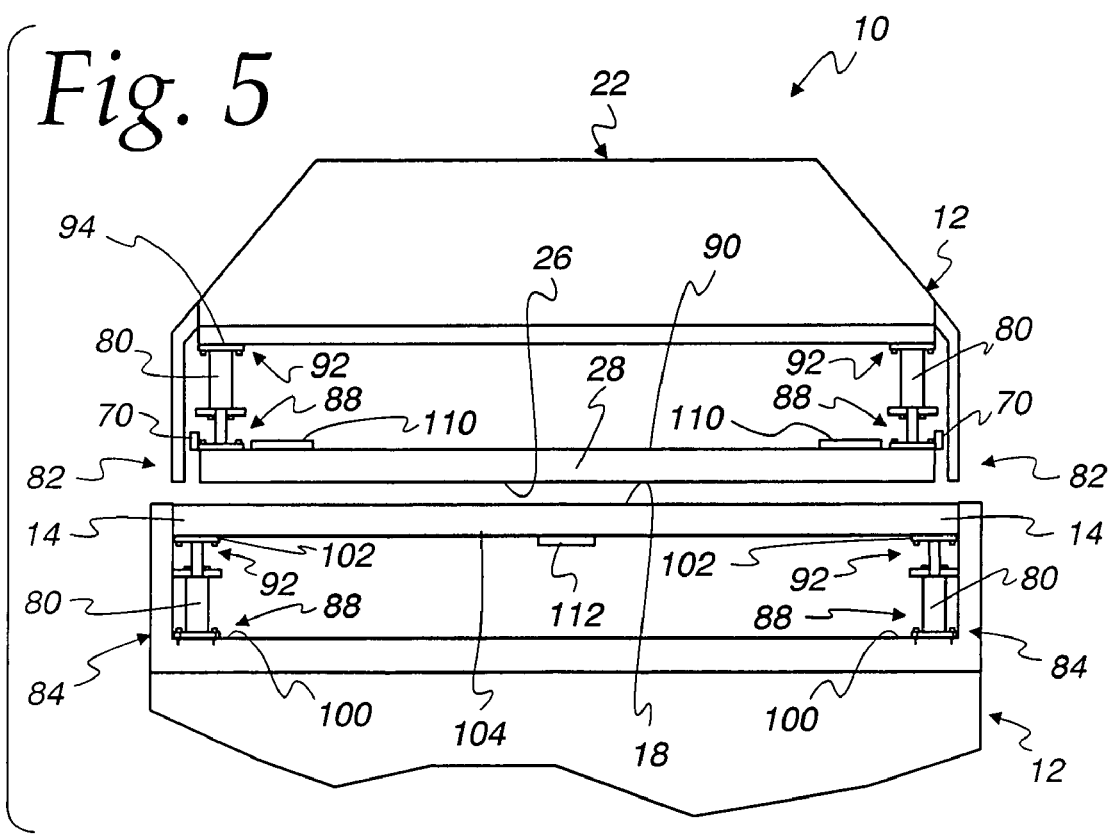
FIG. 5 is a front elevation schematic view of a clamshell grill in accordance with the invention.
Figure 6:
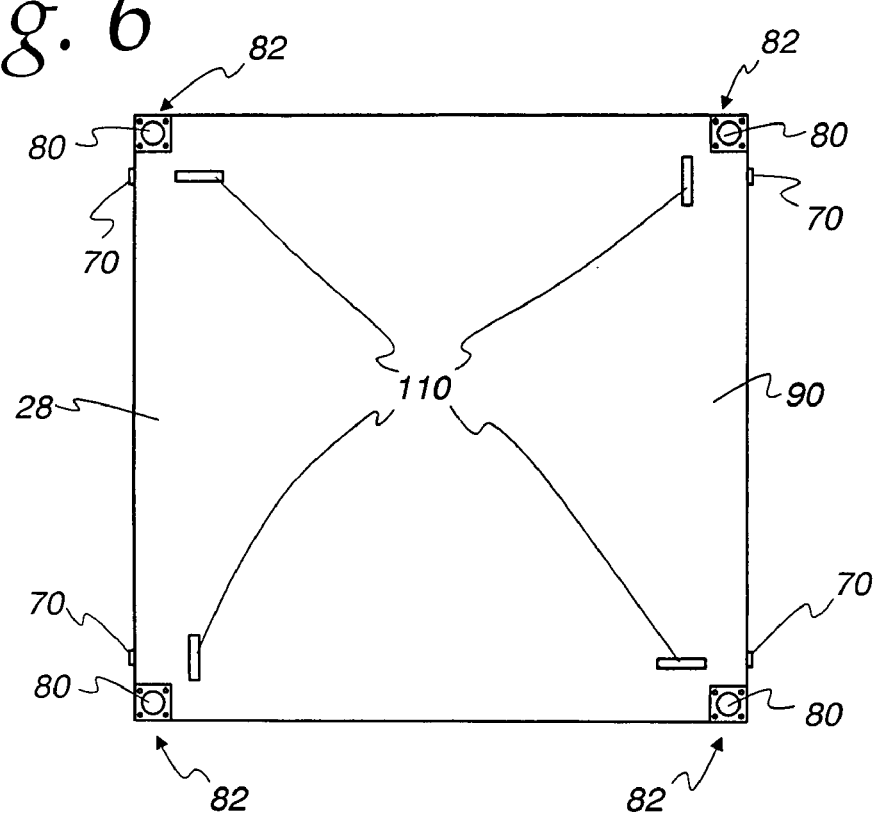
FIG. 6 is a top plan schematic view of the clamshell grill of FIG. 5.

In one aspect of the invention, grill 10 includes a structure to sense when a non-parallel relationship has arisen between platens 14, 28 that have been placed in a cooking position, such as when upper platen 28 has been lowered toward lower platen 14 until platens 14 and 28 are spaced apart a predetermined distance. Referring to FIGS. 5 and 6, grill 10 includes plurality of gap or height sensing devices 70 that communicate data to microprocessor 62. Gap sensing devices 70 measure the gap between lower platen 14 and upper platen 28 to determine if the gaps are uneven and exceed predetermined tolerance levels. Gap sensing device 70 can be any suitable device for measuring or determining the gap between platens 14, 28 including optical devices, infrared sensors, proximity switches, touch sensors, sonar sensors. If the orientation of the platens 14, 28 is sensed to be out of tolerance, i.e. a non-parallel condition, the existence of this condition is indicated to the operator, such as by displaying an error message on user interface 52 or by sounding an alarm. When this occurs, microprocessor 62 optionally may be programmed to prohibit initiation of the food cooking cycle, or interrupt the cooking cycle if previously initiated. Thus, height sensing devices 70 may sense the amount of the gap between platens 14, 28 prior to the start of a cooking cycle, as well as at other times. As explained later in detail, once misalignment has been detected, steps are taken to adjust upper platen 28 and lower platen 14 to restore to the intended parallel relationship. In the event that the non-parallel condition is the result of a warped platen, the warped platen is replaced.

To adjust one or both of platens 14, 28 to a parallel relationship, grill 10 has gap or height adjustment devices 80 for movement of platens 14, 28 into proper alignment. In the exemplary embodiment, height adjustment devices 80 are located proximate each of the four corners 82 of upper platen 28. Height adjustment devices 80 may also be provided at the four corners 84 of lower platen 14. Height adjustment devices 80 may be of any suitable type, for example, a stepper motor, a worm gear motor, or a hydraulic or pneumatic cylinder, mechanical devices, electromechanical devices and other devices.

The bottom side 88 of height adjustment devices 80 are positioned adjacent the top surface 90 of upper platen 28. The top side of 92 of height adjustment devices 80 are positioned adjacent a mounting surface 94 of upper platen assembly 22. By manipulation of height adjustment device 80, the distance between mounting surface 94 and top surface 90 of upper platen 28 can be made larger or smaller. Thus upper platen 28 may be tilted in various directions by height adjustment devices 80, until upper platen 28 is brought to a parallel relationship with lower platen 14. Stated another way, the height adjustment devices 80 bring upper platen cooking surface 26 into a parallel relationship with lower platen cooking surface 18. In the substantially parallel relationship, the gaps between platens 14, 28 are substantially identical at the locations sensed by sensors 70 and adjusted by height adjustment devices 80.

Likewise, lower platen 14 may optionally be provided with height adjustment devices 80 for adjustment of the gap between lower platen 14 and upper platen 28. For example, bottom side 88 of a height adjustment device 80 may be positioned adjacent a lower platen mounting surface 100 of grill support structure 12. Top side 92 of height adjustment device 80 is positioned adjacent a lower platen support surface 102 on the bottom side 104 of lower platen 14. Height adjustment devices 80 are positioned at a plurality of locations adjacent lower platen 14, for example, at each corner of lower platen 14. Thus, manipulation of height adjustment devices 80 may also be used to tilt lower platen 14 in various directions to align lower platen 14 in a parallel relationship to upper platen 28.

Movement of upper platen 28 by height adjustment devices 80 may be conducted independently of the movement of lower platen 14 by height adjustment devices 80. Movement of upper platen 28 and lower platen 14 may also be conducted concurrently. At times it may be advantageous to first operate height adjustment devices 80 to level the lower platen 14. Thereafter, height adjustment devices 80 adjacent the upper platen 28 may be operated to bring lower platen 14 and upper platen 28 into a parallel orientation. In other instances, it may be advantageous to lower upper platen 28 to rest upon lower platen 14, and thereafter adjust one or both of platens 14, 28 to a zero gap adjacent all height adjustment devices 80. Of course, in practice, bringing platens 14, 28 into a parallel relationship may most often be conducted when platens 14, 28 are spaced apart at a desired gap typical for the start point in a cooking cycle for a particular food product.

In one embodiment, the adjustment provided by height adjustment devices 80 may be conducted manually by a service technician. In another embodiment of the invention, when a misalignment of platens 14, 28 is sensed by sensors 70 and communicated to microprocessor 62, the adjustment to bring upper platen 28 back to a parallel relationship with lower platen 14 is accomplished automatically. In this embodiment, data concerning the location and the extent of misalignment of upper platen 28 is sensed by sensors 70 and sent to microprocessor 62. Based on the information received, microprocessor 62 then sends signals to one or more of height adjustment devices 80, to automatically manipulate selected height adjustment devices 80 to cause movement of one or both of platens 14, 28 to adjust the gap between platens 14, 28. The adjustment continues until the spacing between platens 14 and 28 is brought within the predetermined tolerance, i.e., an acceptable degree of a parallel orientation of platens 14 and 28. In the event that microprocessor 62 is unable to bring the platen alignment into tolerance, for example, if one or more of the platens are warped, an error message and/or alarm alerts the operator that further servicing is required. It is noted that microprocessor 62 may be programmed so that prior to beginning the automatic gap adjustment, the food cooking cycle is not initiated, or is discontinued if previously initiated. Microprocessor 62 may also be programmed to calibrate the gaps between platens 14, 28 at preset times. These might include the time grill 10 is first turned on each day. It may include the first time each day that a particular cooking cycle is selected. It may be that the calibration is programmed to take place at the beginning of each cooking cycle every time a cooking cycle takes place. The user also has the option of initiating a calibration procedure at any time by depressing "calibrate now" button 67.

The automatic adjustment of the parallel relationship between upper platen 28 and lower platen 14 may also include the use of height adjustment devices 80 positioned adjacent lower platen 14. Microprocessor 62 communicates with height adjustment devices 80 to move lower platen 14 until brought into a parallel alignment. As with manual adjustment of height adjustment devices 80, the automatic adjustment of lower platen 14 may be conducted independently, or concurrently, with adjustment of upper platen 28.

In another embodiment of the invention, gap sensors 70 sense the height of the gap between platen 14 and 28 during the cooking cycle, including the beginning of a cooking cycle. For instance, an operator may select by means of the interface 52 that grill 10 is to cook quarter pound hamburger patties. Grill 10 includes at least one sensing device 110 for sensing when contact first occurs between upper platen 28 and a food item. When positioning mechanism 24 lowers upper platen 28 into the cooking position, sensor 110 senses the time when first contact with a food item is made by upper platen 28. At the same time sensor 70 senses the amount of the gap between platens 14, 28 when upper platen 28 first contacts the upper surface of the food item. The height of the gap is communicated to microprocessor 62. If the amount of gap at the time of initial contact is other than one that is pre-programmed into microprocessor 62 for the type of food product to be cooked, an error message and or audible alarm alerts the operator of this discrepancy. The operator may then check to determine if the wrong cooking cycle has been selected, or if the wrong size patty or wrong food type, i.e. a chicken breast, has been placed on grill 10. In the event of such error, appropriate action may take place before incorrect cooking and spoilage of the food product occurs. In the event of such an error, microprocessor 62 may also be programmed to interrupt the cooking cycle by turning off heating elements 20 and 20a and raising upper platen assembly 22.

In another embodiment of the invention, apparatus automatically selects a predetermined cooking cycle depending upon information communicated to microprocessor 62 by height sensing devices 70. As upper platen 28 is brought into contact with a food product, sensor 110 senses that initial contact has been made, and communicates this fact to microprocessor 62. Thus, microprocessor 62 is able to determine the height of upper platen 28 at the instant of initial contact with the food product, and hence the height of the food product. Microprocessor 62 can then identify the type of product on the grill, since the heights of various food products. i.e., quarter pound hamburger patties, standard sized hamburger patties (10:1, ten hamburger patties to one pound), etc. are standardized and are programmed into the data base of microprocessor 62. Based on the type of food product identified, microprocessor 62 can then be used to automatically select the appropriate pre-programmed cooking cycle.

Thus, in this mode of operation the operational sequence is as follows: (1) an operator places a plurality of same type hamburger patties on lower platen 14. The patties are placed so that no patty lies on top of another patty, i.e. the patties do not overlap and are not stacked upon each other; (2) The operator rotates the upper platen assembly 22 from the open position to the horizontal position, either manually or by automatic means; (3) The operator pushes the "cook" button 73 on user interface 52; (4) Microprocessor 62 sends a signal to upper platen positioning mechanism 24 to lower upper platen assembly 22 downward toward lower platen 14; (5) upper platen 28 contacts the upper surface of a hamburger patty; (6) Sensor 110 senses that upper platen 28 has initially contacted a patty and communicates this information to microprocessor 62. At the same time, height sensing devices 70 communicate to microprocessor 62 the information sensed by sensors 70 for determining the distance or gap between platens 14, 28 at the instant that sensor 110 first indicated that upper platen 28 contacted a hamburger patty; (7) Microprocessor 62 determines the distance or gap between platens 14, 28 at time of initial contact of the upper surface of the patty; (8) Microprocessor 62 communicates with computer memory 81, including stored information relating to the height of different food product types, and identifies the type of food product on lower platen 14; (9) Microprocessor 62 communicates with computer memory 81 to select the food cooking cycle corresponding to the type of food product identified as being on lower platen 14, and cooks the food product according to the selected food cooking cycle.

Optionally, the pre-programmed positioning of the height of the upper platen 28 may be monitored during the cooking cycle based on the readings received from sensors 70 and 110. Additionally, the heating cycle may be modified or controlled by microprocessor 62 during the cooking cycle based on information received by sensors 70, 110. For example, the height of upper platen 28 relative to lower platen 14 may be changed based on the readings taken by sensing device 110, including a reading as to the amount of the pressure being applied by upper platen 28 to the food product as it is being cooked. Such adjustments in the height of upper platen 28 may include utilization of height adjustment devices 80, utilization of linear actuator 32, or both.

Since the product identification is automatically sensed in this mode of operation, the human error in selecting the cooking cycle can be eliminated. This is because the need for human input to select the cooking cycle is not required. The product identification may also be automatically made by other means. For example, the weight of lower platen 14 is measured by load cell 112, and this weight is sent to microprocessor 62. Microprocessor 62 compares the loaded weight to the unloaded weight of lower platen 14, and computes the weight of the food product. Based on food product weight tolerances, and integer multiples thereof, microprocessor 62 can determine the type of food product that has been placed on lower platen 14, i.e., quarter pound patties or regular sized patties. Once microprocessor 62 identifies the food product type, the appropriate cooking cycle is activated by microprocessor 62.

It is noted that load cell 112 can be utilized to determine not only the type of food product, but also the number of individual pieces, i.e. patties. Thus, this information can be further utilized by microprocessor 62, to anticipate the heating requirements that will be needed during a specific cooking cycle for a particular load. Hence, if microprocessor 62 is informed that the grill will be cooking three quarter-pound hamburger patties, as opposed to six quarter-pound hamburger patties, for example, microprocessor 62 can adjust the power or fuel sent to heating units 20 and 20a, respectively, to adjust the temperature of platens 14 and 28. Microprocessor 62 may also adjust the length of time of the cooking cycle at platens 14, 28.

Figure 9:
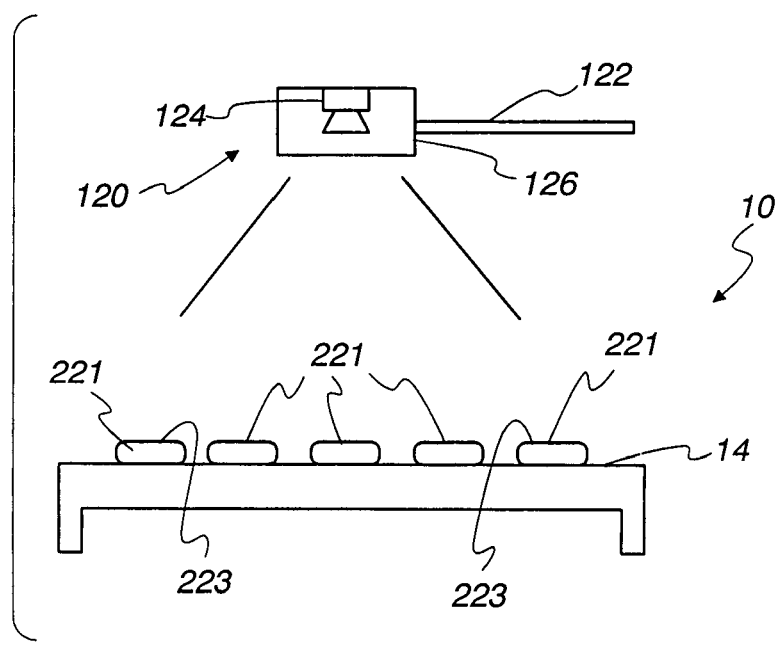
FIG. 9 is a schematic view of the vision system for the grill.

FIG. 9 illustrates an alternative optical or vision system 120 for determining the number of food product pieces on grill 10. Vision system 120 is provided at grill 10. Vision system 120 includes camera 124, camera software and, if needed, supplemental lighting (not shown). Camera 124 is preferably mounted on the ceiling above grill 10 so that camera 124 is out of the way but still has a clear view of the entire grill surface. Camera 124 may also be mounted at other locations, such as by support 122. Camera 124 may be enclosed in an enclosure 126 with a transparent panel to protect it from smoke, heat and grease. A suitable vision system is available from Banner Engineering Corp. of Minneapolis, Minn., which is a self-contained camera system with a built-in processor, an Ethernet connection and an output for connecting a television monitor. The camera operates with Banner's PresencePLUS software. The inspection time for this camera system is approximately one second. A standard grayscale camera may be used in basic applications. However, in a restaurant that serves a variety of food items having similar sizes, shapes and appearances, a color camera is preferred since color makes it easier to distinguish the different types of food items.

Camera 124 may be positioned slightly off to one side of grill 10 to avoid smoke and grease. The field of view of camera 124 is preferably slightly larger than the grill size. Depending on the type of camera used and the ambient lighting in the kitchen area, supplemental lighting may be required to ensure consistent operation of the vision system. For example, standard fluorescent lighting may be adequate, but with some cameras the ballast used to drive the fluorescent tubes may need to be a high frequency ballast rather than a standard magnetic ballast.

Figure 7:
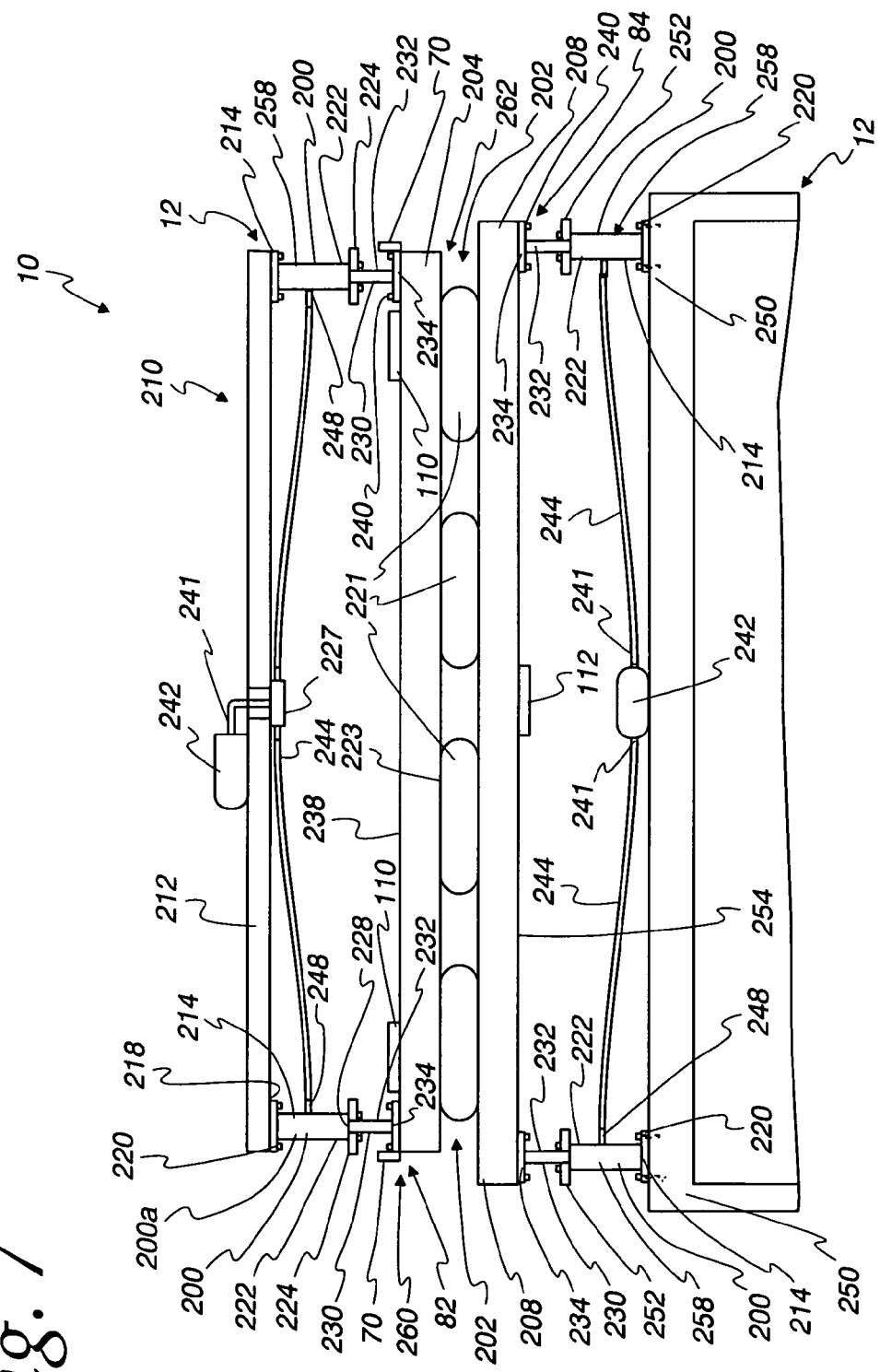
FIG. 7 is a front elevation schematic view of another clamshell grill in accordance with the invention.

The vision system software includes analysis tools that use information from an image captured by the camera to create size, shape and count measurements. These tools use so-called "blob" processing to identify various food items with different sizes and then separate those that are the same size. Blob analysis consists of a series of processing operations and analysis functions that produce information about any two-dimensional shape in an image captured by the camera. It is useful for finding "blobs" whose spatial characteristics satisfy certain criteria and find their size and number. As such, it is well suited to identifying and counting food items of known shapes and sizes. A "blob tree" is defined in the software that includes all of the blobs for the various types of food items with which the system is used. A "roundness" parameter separates square patties from round patties. With system 120 communicating information with microprocessor 62, the number of food pieces about to be cooked at grill 10 can be ascertained, and microprocessor 62 can utilize this information to adjust the cooking power or fuel supplied to heating units 20 as described previously, Referring now to FIG. 7 and returning again to the gap adjustment functions of grill 10, it is noted that height adjustment devices 80 can be any one of a number of different devices. For example, as mentioned previously, a stepper motor, a worm gear drive motor, or a hydraulic or pneumatic cylinder, mechanical devices and electromechanical devices and other devices could be used for adjusting the height of platens 14 or 28. FIG. 7 illustrates an embodiment using air cylinders 200 for adjusting the gap 202 between an upper platen 204 and a lower platen 208. A plurality of hamburger patties 221 each having an upper surface 223 are shown positioned on lower platen 208. In this embodiment, an upper platen assembly 210 includes a support, or mounting surface 212 secured to support structure 12 of grill 10. Air cylinders 200 are mounted to upper platen 204 at support 212. Air cylinders 200 may be provided for adjustably mounting upper platen 204 to support 212 at two, three or more locations. Air cylinders 200 have a base end 214 that is secured to lower surface 218 of support 212, such as by bolts 220. The piston end 222 of air cylinders 200 may be additionally secured to another mounting surface 224 connected to upper platen assembly 210, and secured thereat by bolts 220. Mounting surface 224 has a bore 228 through which cylinder piston 230 extends. End 232 of piston 230 has a mounting flange 234 secured thereto. Flange 234 is secured by bolts 240 to an upper surface 238 of upper platen 204.

An air compressor 242 is positioned within grill 10, such as within upper platen assembly 210 by mounting to support 212. A compressed air supply line 244 is connected at one end to outlet 241 of air compressor 242, and at the other end to cylinder air inlet 248 via manifold 227. In a like manner, lower platen 208 is supported by two, three, or more air cylinders 200. Supports 250 and 252 are secured to support structure 12. Cylinder base 214 is attached to support 250, and piston end 222 of air cylinder 200 is mounted to support 252 in the manner previously described. End 232 of piston 230 is attached to the bottom surface 254 of lower platen 208.

Pistons 230 are reciprocally moveable relative to cylinder housing 258 by application of compressed air from air compressors 242. Hence, movement of piston 230 causes movement of platen 204, or 208, at the point of the platen where piston 230 is attached. By way of example, when piston 230 of cylinder 200a is extended downward, upper platen 204 is moved downward away from support surface 212. Stated another way, as piston 230 of cylinder 200a is extended, the left side 260 of upper platen 204 is tilted downward relative to the right side 262 of upper platen 204. Conversely, when piston 230 is moved upward, left side 260 of upper platen 204 is moved upwards to tilt left side 260 upward relative to right side 262. It is noted that as upper platen 204 is moved, gap sensing devices 70 are continuously measuring the height of gap 202 and communicating this information to microprocessor 62. Thus, with microprocessor 62 executing a controlled tilting of upper platen 204 by air cylinders 200, while constantly receiving readings from height sensors 70 of the height of gap 202 adjacent each of cylinders 200, a misaligned platen 204 can be restored to within an acceptable tolerance for the parallel relationship with lower platen 208. Preferably, the tolerance from parallel between the upper and lower platens from corner to diagonal corner of the platens is no more than about 0.020 inches or less from parallel or as otherwise desired.

The order in which microprocessor 62 selects to move a particular piston 230 may be pre-programmed into microprocessor 62. A number of different sequences can be used to successfully reposition upper platen 204 to the horizontal or to a parallel relationship with lower platen 208. As one example, microprocessor 62 first senses which location of upper platen 204 is closest to the desired gap for the identified food product. Thereafter microprocessor 62 is programmed to move the cylinder 200 adjacent that location to the precise gap height required by the cooking cycle for the identified food product. Next, microprocessor 62 moves the piston 230 that is adjacent the location of upper platen 204 that is sensed to be farthest from the desired gap height, moving that air cylinder 200 to position upper platen 204 to the required gap amount at that location. Once this is done, microprocessor 62 will move whichever cylinder that is then is farthest from the desired gap height, to the desired gap height. This sequence may be continued until upper platen 204 is brought into a parallel relationship with lower platen 208, and is also positioned at the desired preprogrammed gap height. If after a certain period of time this is not accomplished, microprocessor 62 may abort positioning of upper platen 204 and conduct a similar sequence to that discussed above with regard to lower platen 208. If further adjustment is indicated to be required, microprocessor 62 can again return to another sequence of moving upper platen 204. If microprocessor 62 is unable to bring gaps 202 into tolerance, microprocessor 62 may be programmed to sound an alarm and provide an error message that servicing is required.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A method of identifying a type of a food item using a two-sided grill having upper and lower cooking platens comprising:

placing at least one food item having a characteristic height on a lower cooking platen of a grill;

moving the upper cooking platen toward the lower cooking platen;

sensing when the upper cooking platen first contacts the food item;

automatically determining the distance between the platens when the upper cooking platen first contacts the food item by measuring with at least one distance measuring sensor the distance between the upper cooking platen and the lower cooking platen when the upper cooking platen first contacts the food item, which distance is a measure of the characteristic height of that type of food item; and identifying the food item based on the distance compared to the characteristic height of at least one food item.

2. The method of claim 1 further comprising storing in a computer accessible memory a plurality of characteristic heights, each height corresponding to a different food item.

3. The method of claim 2 further comprising comparing a determined distance to a plurality of stored characteristic heights to identify the food item.

4. The method of claim 1 further comprising determining the number of food items of the identified type that are on the lower cooking platen.

5. The method of claim 4 wherein said determining the number of food items comprises weighing the food items on the lower cooking platen.

6. The method of claim 5 further comprising comparing the weight of the food items to an integer multiple of a plurality of characteristic food item weights.

7. The method of claim 5 wherein said determining the number of food items comprises identifying the number of food items with a machine vision device.

8. A dual-surface grill comprising:
a support structure;
a lower cooking platen mounted to said support structure;
an upper cooking platen mounted to said support structure for movement between a cooking orientation and a non-cooking position, the platens being at least substantially parallel to each other when in the cooking orientation;
means for sensing the distance between the platens by at least one distance sensing device positioned proximate to the platens when the upper cooking platen first contacts a food item placed on the lower cooking platen, the distance sensing device sensing the actual distance between platens when the platens are in the cooking orientation and when the upper cooking platen first contacts the food item placed on the lower cooking platen;
means for determining when the upper cooking platen first contacts a food item placed on the lower cooking platen;
means for determining the distance between the upper and lower cooking platens when the upper cooking platen first contacts the food item on the lower cooking platen.

9. The grill of claim 8 further comprising computer accessible memory storing a plurality of characteristic heights, each height corresponding to a different food item.

10. The grill of claim 9 further comprising a computer processor for comparing the determined distance to the plurality of characteristic heights to determine the food item type contained on the lower cooking platen.

11. The grill of claim 8 further comprising means for determining the number of food items that are present on the lower cooking platen.

12. The grill of claim 11 wherein said means for determining the number of food items comprises a weighing device associated with the lower cooking platen.

13. The grill of claim 12 wherein the weighing device comprises a load cell.

14. The grill of claim 11 wherein said means for determining the number of food items comprises a machine vision device.

15. The grill of claim 10 further comprising cooking data corresponding to the different food items.

16. The grill of claim 15 further comprising a microprocessor controller for operating the grill in accordance with the cooking data for the type of food item determined to be located on the lower cooking platen.

17. The grill of claim 8 wherein the means for determining when the upper cooking platen contacts a food item on the lower cooking platen comprises a pressure sensing device.

18. A dual-sided grill device comprising:
a support structure;
a lower cooking platen mounted to said support structure;
an upper cooking platen mounted to said support structure for movement between a cooking orientation and a non-cooking position, the platens being at least substantially parallel to each other when in the cooking orientation;
means for sensing the distance between the upper cooking platen and the lower cooking platen at three different locations that are non-linear with respect to each other when in the cooking orientation;
means for automatically comparing the three sensed distances to determine whether the upper and lower cooking platens are relatively parallel to each other when the platens are in the cooking orientation.

19. The device of claim 18 further comprising:
means for adjusting at three different non-linear locations independently of each other the distance between the upper and lower cooking platens while the platens are in the cooking orientation, if the comparison of the three sensed distances determines that the platens are not relatively parallel so that the platens can be placed in a relatively parallel relationship when in the cooking orientation.

20. The device of claim 19 wherein said means for adjusting at three locations independently of each other comprises a plurality of manually adjustable devices for changing the relative orientation of the platens with respect to each other, and at least three of the manually adjustable devices are positioned in a non linear relationship to each other.

21. The device of claim 18 further comprising means for determining when the upper cooking platen contacts a food item placed on the lower cooking platen; and
means for determining the distance between the upper and lower cooking platens when the upper cooking platen contacts the food item on the lower cooking platen.

22. The device of claim 21 further comprising computer accessible memory storing a plurality of characteristic heights, each height corresponding to a different food item.

23. The device of claim 22 further comprising a computer processor for comparing the determined distance to the plurality of characteristic heights to determine the food item type contained on the lower cooking platen.

24. The device of claim 20 further comprising means for determining the number of food items that are present on the lower cooking platen.

25. The device of claim 24 wherein said means for determining the number of food items comprises a weighing device associated with the lower cooking platen.

26. The device of claim 25 wherein the weighing device comprises a load cell.

27. The device of claim 24 wherein said means for determining the number of food items comprises a machine vision device.

28. The device of claim 23 further comprising cooking data corresponding to the different food item types.

29. The device of claim 28 further comprising a microprocessor controller for operating the device in accordance with the cooking data for the type of food item determined to be located on the lower cooking platen.

30. The grill of claim 8 wherein the means for determining when the upper cooking platen contacts a food item on the lower cooking platen comprises a pressure sensing device.

* * * * *